Sept. 20, 1949. C. L. MOYER 2,482,685
THREE-KNIFE TRIMMING MACHINE
Filed April 29, 1947 10 Sheets-Sheet 1

Inventor:
Charles L. Moyer
By: Lee J. Gary
Attorney

Sept. 20, 1949.    C. L. MOYER    2,482,685
THREE-KNIFE TRIMMING MACHINE
Filed April 29, 1947    10 Sheets-Sheet 2

Inventor
Charles L. Moyer
By Lee J. Gary
Attorney

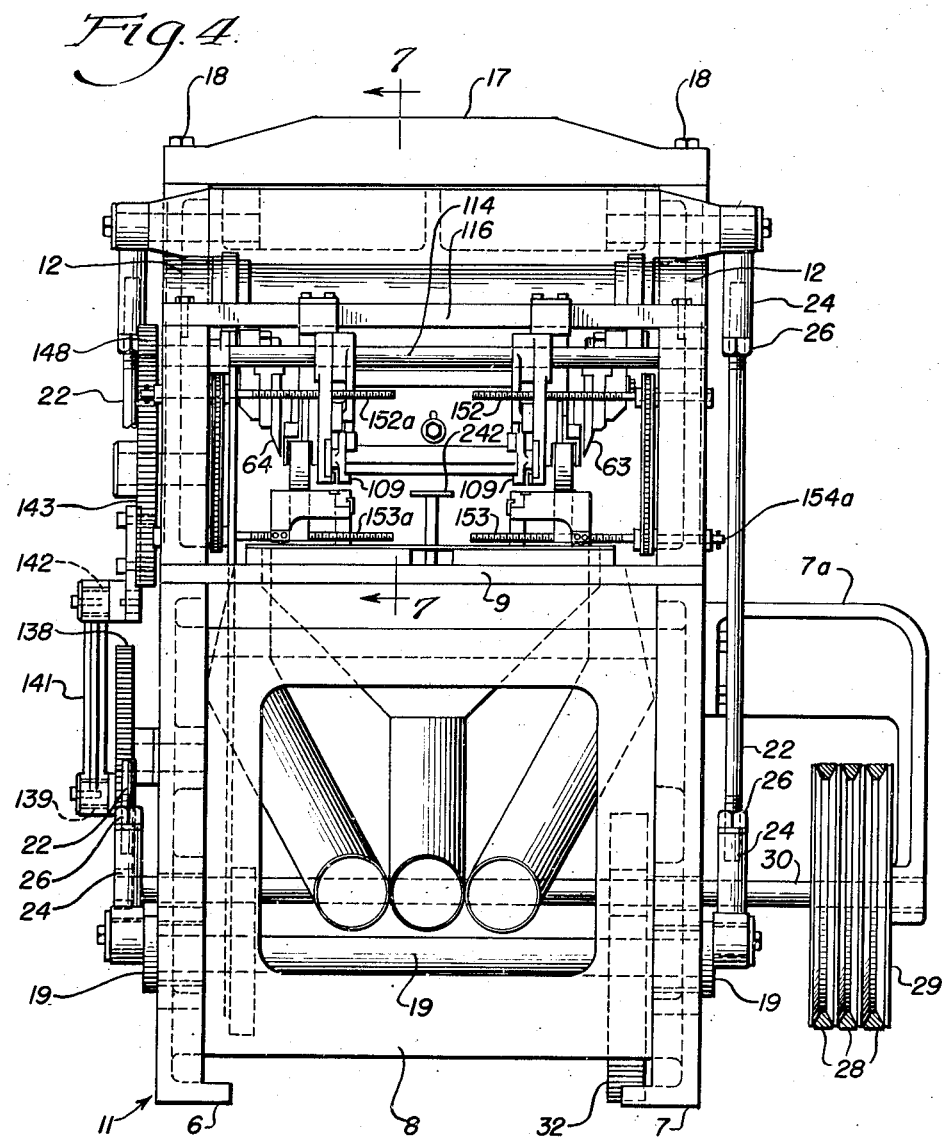
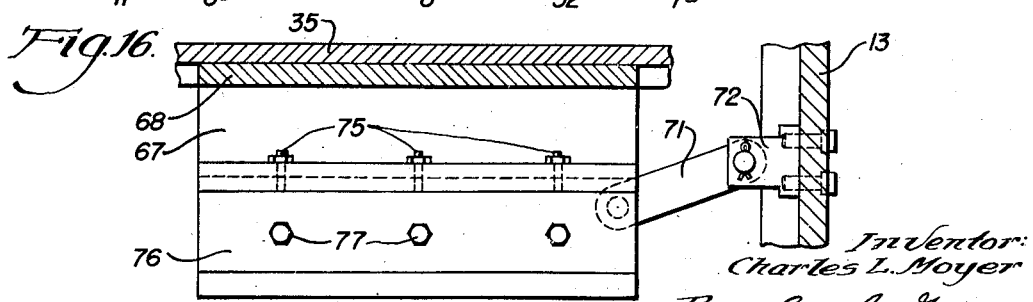

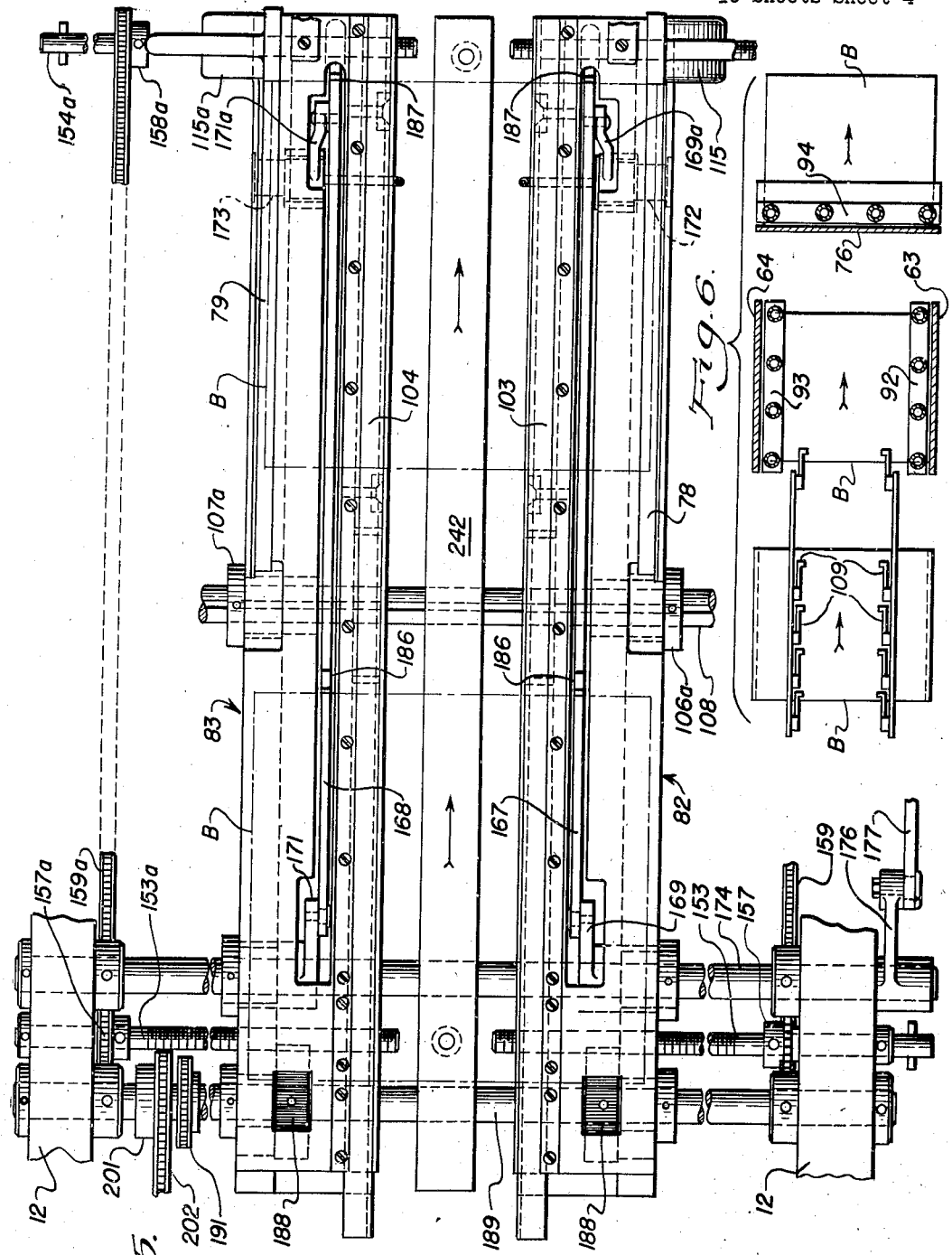

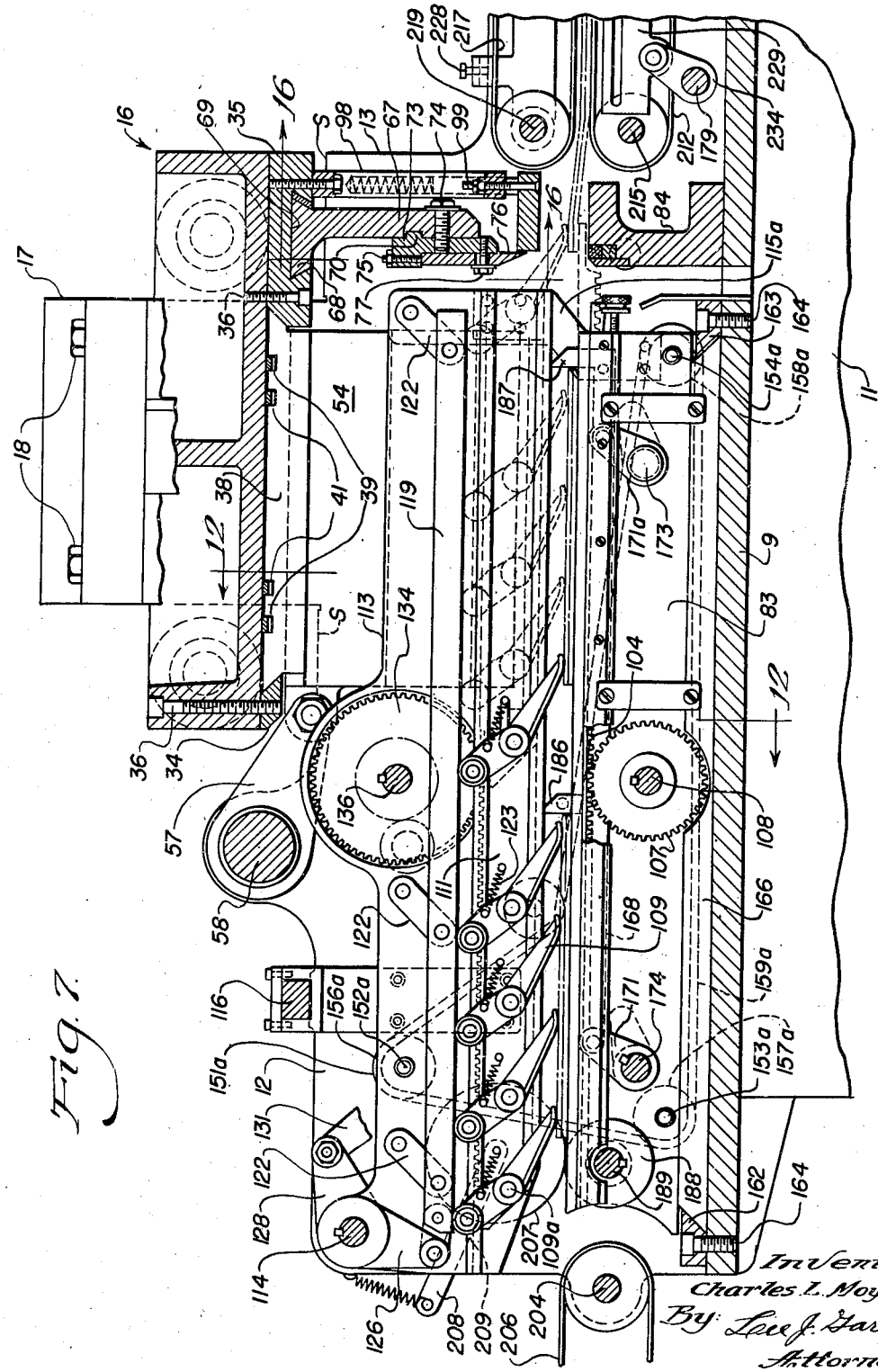

Sept. 20, 1949.  C. L. MOYER  2,482,685
THREE-KNIFE TRIMMING MACHINE
Filed April 29, 1947                    10 Sheets-Sheet 6

Inventor:
Charles L. Moyer
By Lee J. Gary
Attorney

Sept. 20, 1949.  C. L. MOYER  2,482,685
THREE-KNIFE TRIMMING MACHINE
Filed April 29, 1947  10 Sheets-Sheet 7
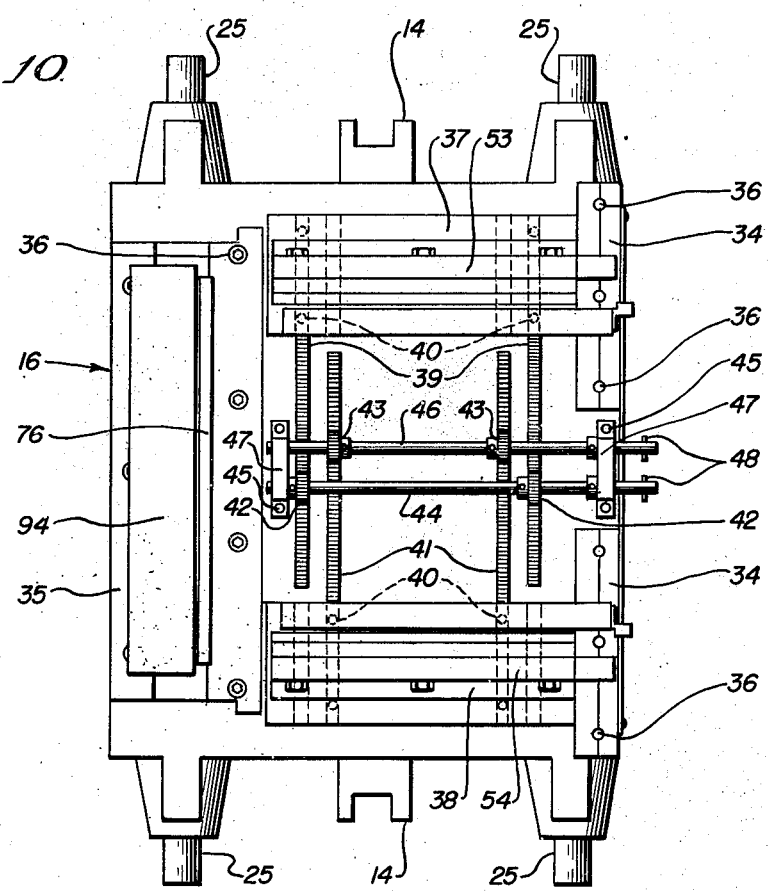
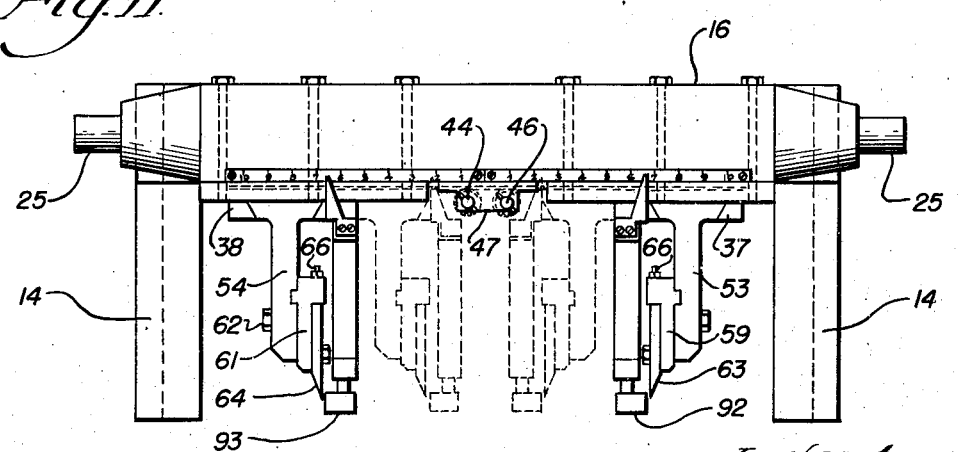
Inventor:
Charles L. Moyer
By Lee J. Gary
Attorney Sept. 20, 1949.  C. L. MOYER  2,482,685
THREE-KNIFE TRIMMING MACHINE
Filed April 29, 1947  10 Sheets-Sheet 8

Inventor:
Charles L. Moyer
By: Lee J. Gary
Attorney.

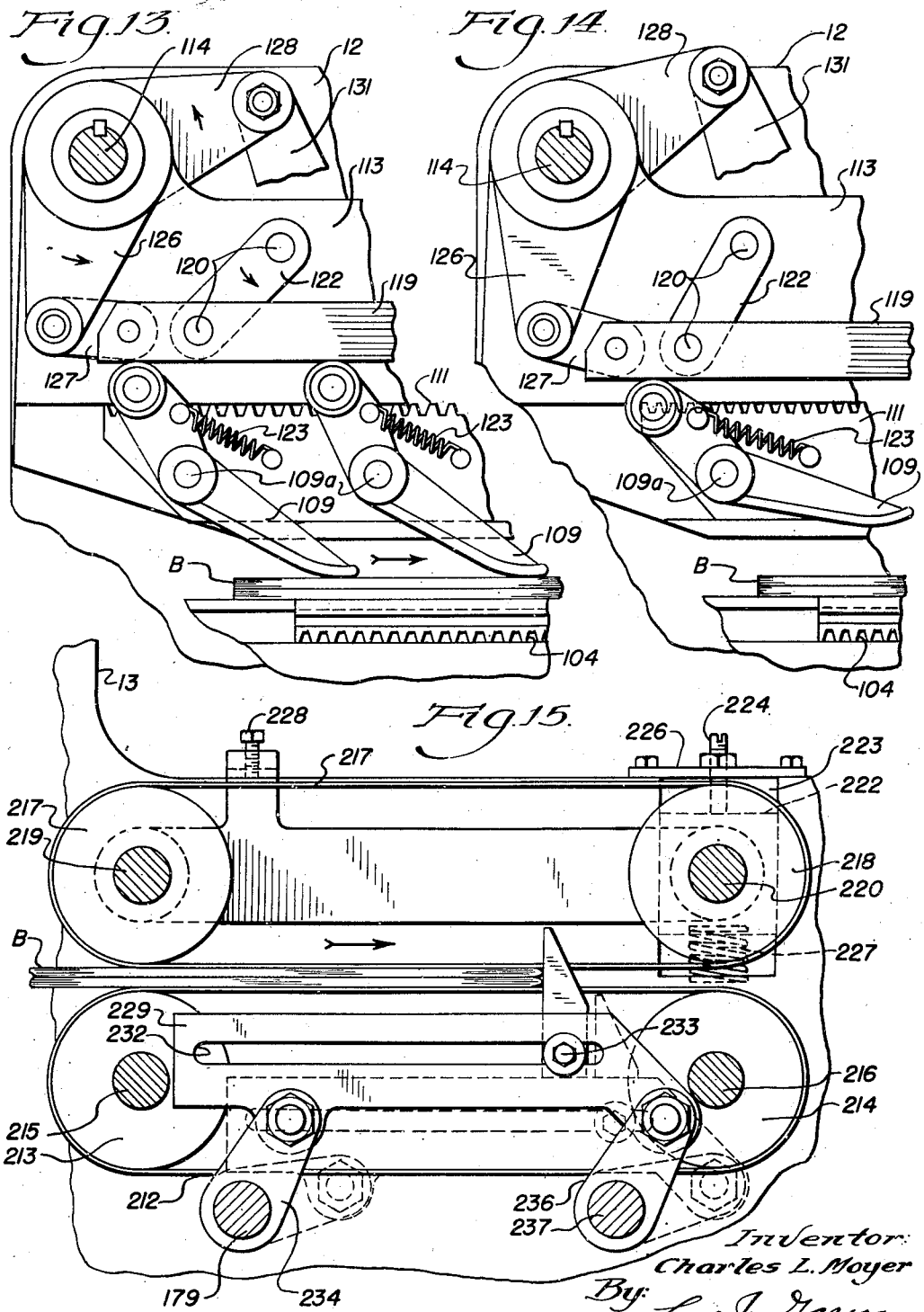

Sept. 20, 1949.　　　　　　　C. L. MOYER　　　　　　　2,482,685
THREE-KNIFE TRIMMING MACHINE
Filed April 29, 1947　　　　　　　　　　　　　　　　　10 Sheets-Sheet 10
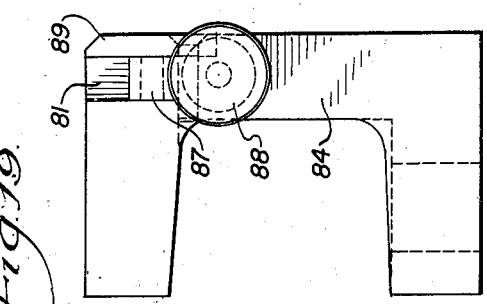
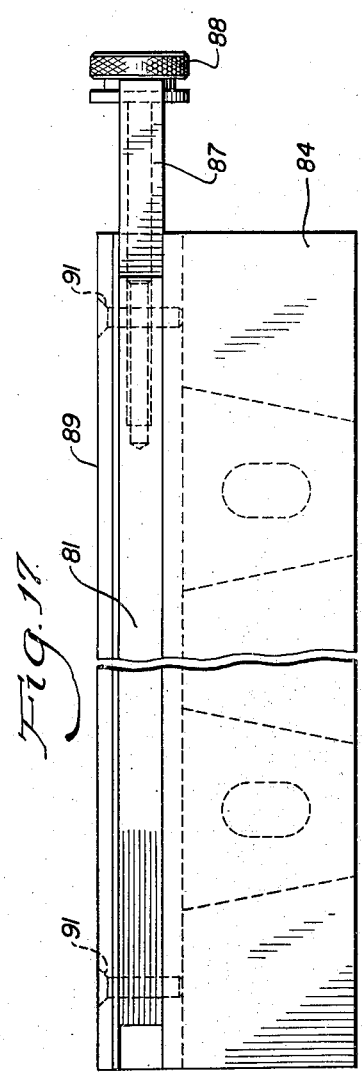
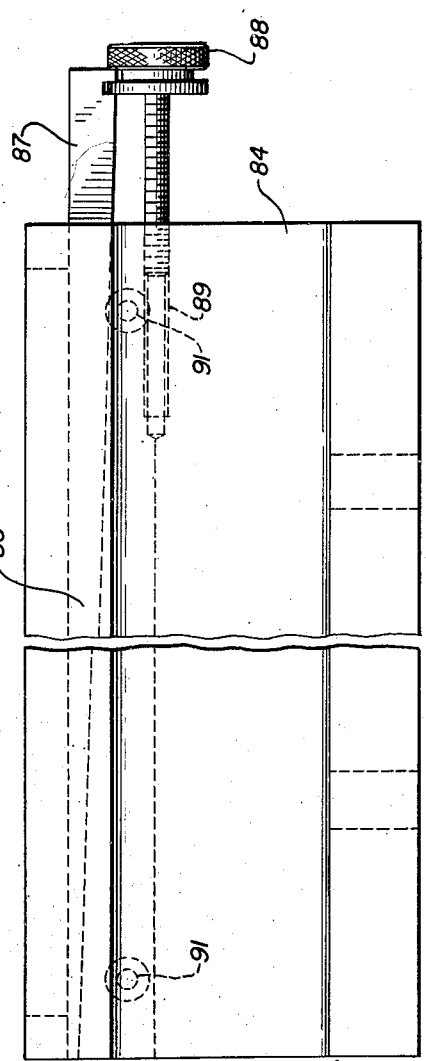
Inventor:
Charles L. Moyer
By: Lee J. Gary
Attorney Patented Sept. 20, 1949

2,482,685

UNITED STATES PATENT OFFICE 2,482,685

THREE-KNIFE TRIMMING MACHINE

Charles L. Moyer, Chicago, Ill., assignor to C. L. Moyer Company, Chicago, Ill., a corporation of Illinois Application April 29, 1947, Serial No. 744,665

33 Claims. (Cl. 164—48)

This invention relates to improvements in book trimming machines, and is more particularly concerned with a trimming machine embodying three knives for trimming the head, foot, and front edges of bound books, catalogs, pamphlets, and the like.

It is an object of the present invention to provide a book trimming machine in which untrimmed books are adapted to be automatically conveyed from either a feed hopper or a binding machine into position to be trimmed at the head and foot by means of a pair of knives disposed in spaced parallel relation. In thus trimming the head and foot of books, the trimming knives and the cutting blocks associated therewith are adjustably positioned upon a common knife carrier, and suitable means are provided for manually adjusting the spacing between said knives to accommodate books of different heights. After a book has been trimmed at its head and foot, it is moved longitudinally through the machine by means of coacting feed rails and friction fingers and then brought to rest against retractable stop members which are adjustably positioned in predetermined spaced relation to a front-edge trimming knife which is also mounted on the knife carrier. After a book has been trimmed along its front edge, the retractable stop members are retracted to permit the trimmed book to be conveyed outwardly from the machine between opposing sets of endless belts disposed to frictionally engage the front and back of the book.

In the use of book trimming machines of the types heretofore provided, it has been difficult, if not impossible, to maintain a sharp cutting edge on the trimming knives and to maintain a relatively smooth coacting surface on the cutting blocks. The present invention contemplates the provision of a trimming machine in which the knife carrier and cutting blocks are mounted on a common frame, the knife carrier being reciprocated along said frame to move the cutting knives into and out of contact with the cutting blocks. At the termination of the cutting stroke, the knife carrier is brought into direct contact with the frame of the machine to insure that the knife edges will not cut into the surface of the cutting blocks. In the operation of the present trimming machine, it has been found that the trimming knives and blocks have a much longer service life and require fewer adjustments due to the use of the frame as a stop in limiting the cutting stroke of the knife carrier.

It is a further object of this invention to provide a book trimming machine in which each cutting block is preferably formed square in cross section to provide four flat surfaces. After a cutting surface has become marred, it is thus possible to rotate the cutting block about its axis to present a smooth, unmarred cutting surface to coact with the knife. This invention further contemplates the provision of an improved mounting for the cutting blocks to permit lateral adjustment of the block and thus present an unmarred surface to coact with the cutting knife.

This invention further contemplates the provision of a book trimming machine in which three knives are mounted on a reciprocable knife carrier, two of the knives being disposed in spaced parallel relation to trim the head and foot of a book while the third knife is trimming the front edge of an adjacent book.

This invention embodies other novel features, details of construction and arrangement of parts which are hereinafter set forth in the specification and claims, and illustrated in the accompanying drawings, wherein:

Fig. 4 is an end view of the machine.

Fig. 5 is a sectional view taken along the line 5—5 of Fig. 2.

Fig. 6 is a diagrammatic plan view illustrating the manner in which books to be trimmed are first trimmed along the head and foot and then trimmed along the front edge.

Fig. 7 is a longitudinal sectional view taken along the line 7—7 of Fig. 4.

Fig. 10 is a bottom plan view illustrating a knife carrier and the means for adjusting the spacing between a pair of spaced parallel knives.

Fig. 11 is an end view of same.

Fig. 13 is a fragmentary longitudinal sectional view illustrating the means employed for frictionally engaging and feeding books through the machine.

Fig. 14 is a view similar to Fig. 13, showing the feed fingers in their retracted positions.

Fig. 15 is a fragmentary longitudinal sectional view illustrating a retractable stop mechanism employed for holding magazines in position to be trimmed along their front edges.

Fig. 16 is a detail, transverse sectional view taken along the line 16—16 of Fig. 7.

Fig. 17 is a detail, plan view showing the transverse cutting table and the means employed for adjusting the cutting block mounted thereon.

Fig. 18 is a front elevational view of same.

Fig. 19 is an end elevational view of same.

*Machine base*

Figure 1:
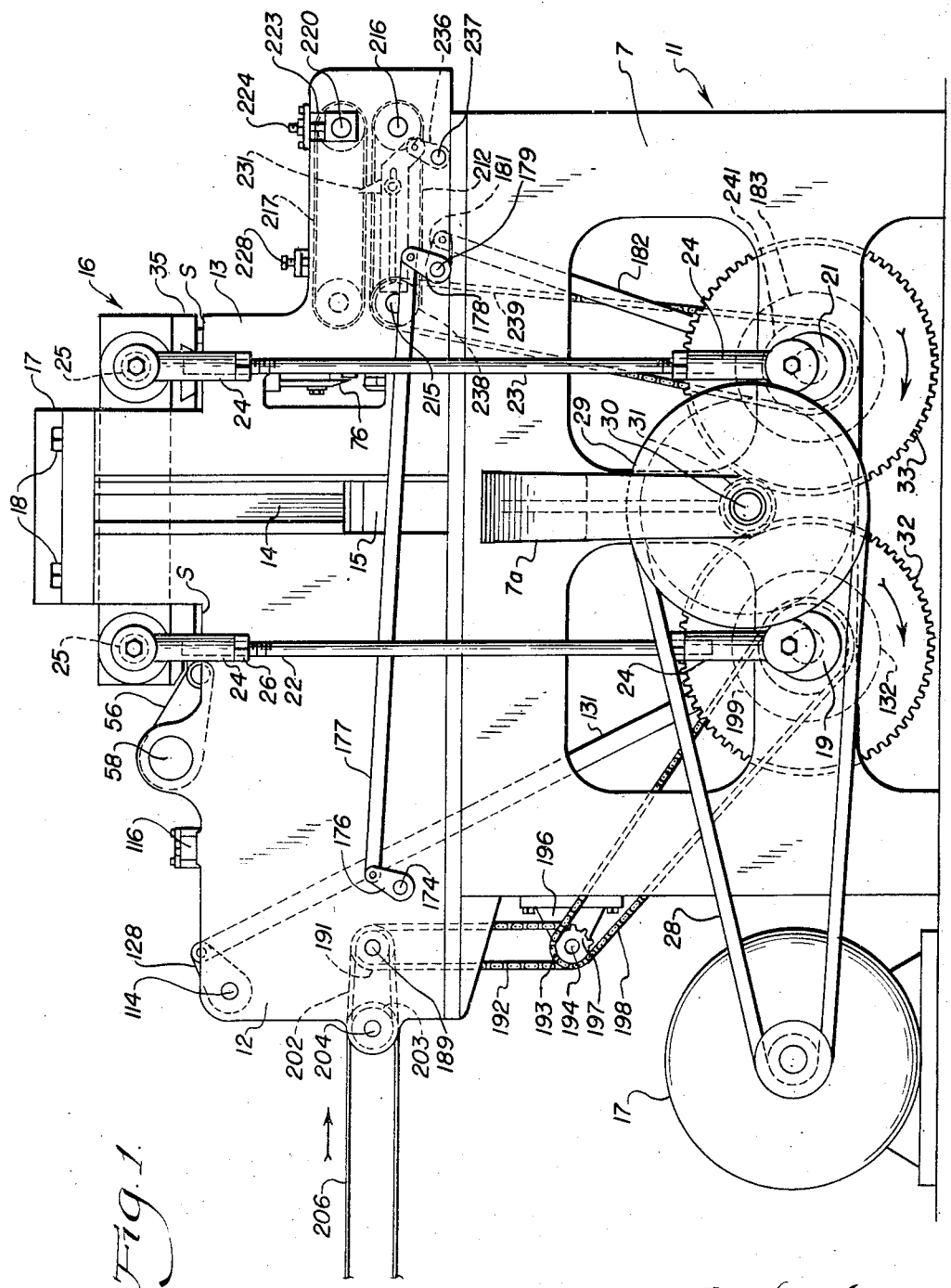
Fig. 1 is a side elevational view illustrating a machine embodying features of this invention.

Referring now to the drawings for a better understanding of this invention, the book trimming machine is shown as comprising a pair of base frame members 6 and 7 connected in spaced parallel relation by means of one or more transverse frame members 8. A flat, horizontally disposed top plate 9 is bolted to the upper ends of the base frame members 6 and 7 to form therewith a strong, rigid, table top base, generally indicated at 11. During the construction of a trimming machine, the base 11 is assembled first and the entire upper surface of the table top 9 is then accurately machined to provide a finished, smooth working surface upon which the upper portion of the machine may be positioned and secured. It will readily be appreciated that the provision of a sturdy base 11 having a smooth, finished table top surface greatly facilitates mounting, arranging, and assembling of parts supported thereon.

*Knife carrier mounting*

A pair of front bearing frames 12—12 extend rearwardly in spaced parallel relation along the top surface of the base 11 and are secured thereto by means of bolts or cap screws. A pair of rear bearing frames 13—13, disposed in spaced parallel relation, are also secured to the top of the base 11 by means of bolts or screws. The rear edges of the front bearing frames 12—12 and the front edges of the rear bearing frames 13—13 define vertically disposed guide recesses 15 adapted to receive a pair of guide flanges 14—14 provided on opposite sides of a knife carrier 16. To provide a relatively strong, rigid upper frame structure, the upper ends of the front bearing frames 12—12 and rear bearing frames 13—13 are secured together by means of a cover plate 17 and cap screws 18.

*Knife carrier drive*

A pair of crank shafts 19 and 21, journaled in bearings provided on the base frame members 6 and 7, are each formed with a pair of similar crank portions adjacent their outer ends to receive bearing members 24, the latter being internally threaded to adjustably receive and engage the threaded lower ends of connecting rods 22 and 23. The upper ends of the connecting rods 22 and 23 are also threaded for adjustable engagement in internally threaded bearing members 24 which are formed to receive stud journals 25 provided on opposite sides of the knife carrier 16. The bearing members 24 are secured against displacement from the stud journals 25 and crank portions of the crank shafts 19 and 21 by means of cap screws and washers. Lock nuts 26 are provided on the connecting rods 22 and 23 for locking engagement against the inner ends of the bearing members 24. During downward or cutting stroke movement of the knife carrier 16, it will be noted that the knife carrier contacts and is brought to rest against stop shoulders S formed on each of the bearing frames 12—12 and 13—13, thereby accurately terminating the cutting stroke of the knife carrier.

The crank shafts 19 and 21 are rotated in timed relation by means of an electric motor 27 which acts through one or more endless belts 28 to drive a pulley 29 keyed to a drive shaft 30. The drive shaft 30 is journaled at its ends in suitable bearings provided on the base frame members 6 and 7, and may also be journaled at its pulley supporting end by a bracket bearing 7a. A driving pinion 31 is keyed to the drive shaft 30, adjacent the inner side of the base frame member 7, to drive a pair of driven gears 32 and 33 keyed to the crank shafts 19 and 21, respectively.

*Mounting of head and foot trimming knives*

Figure 12:
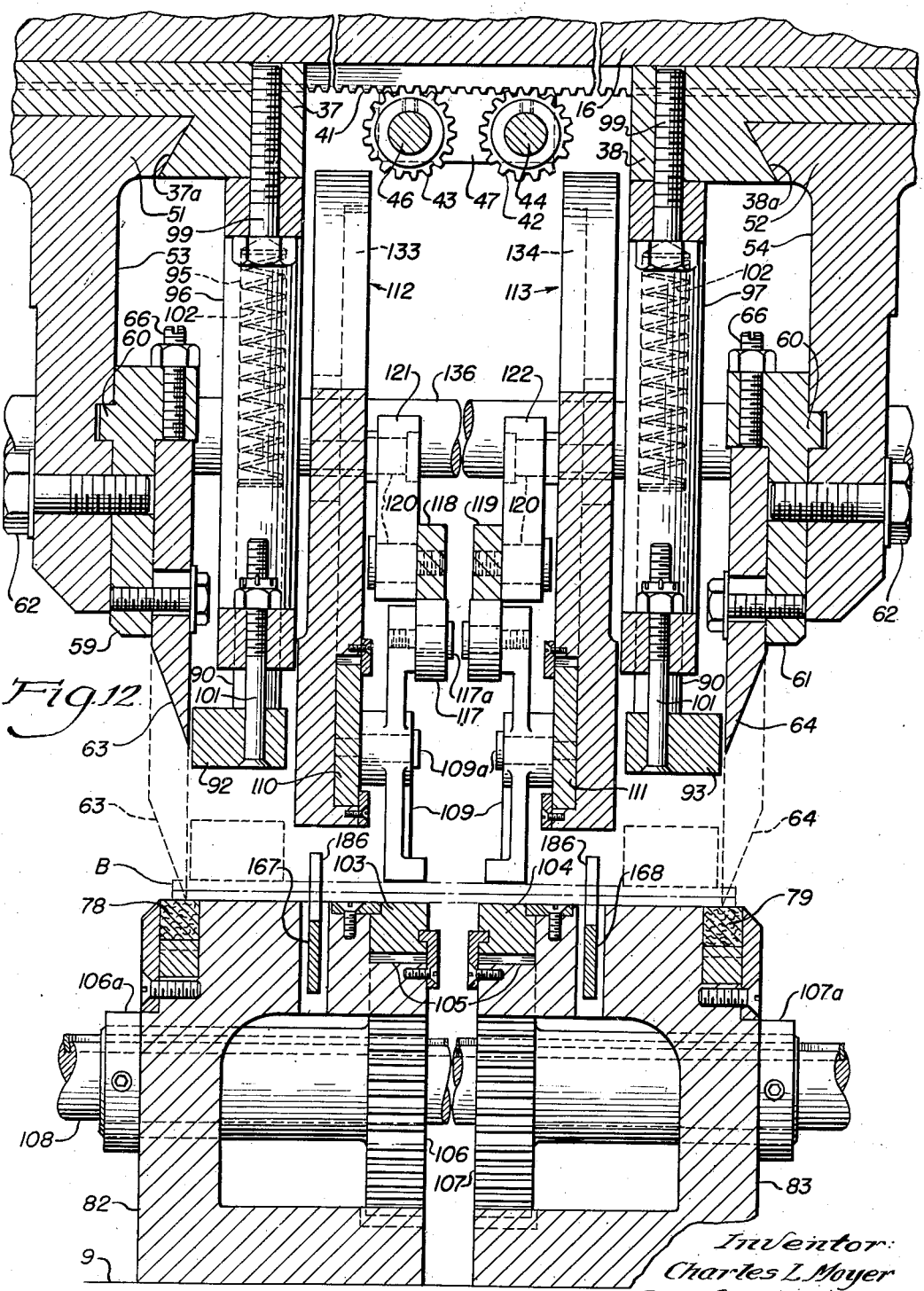
Fig. 12 is a sectional view taken along the line 12—12 of Fig. 7.

The lower side of the knife carrier 16 is accurately machined to provide a smooth, finished surface to receive a pair of transversely disposed guide plates 34 and 35 which are secured in spaced parallel relation by cap screws 36 and have their opposing side edges tapered inwardly to define, with the finished under-surface of the knife carrier, a dove-tail groove to receive a pair of transversely movable dove-tail carriages 37 and 38. As illustrated in Figs. 7 and 12, the carriages 37 and 38 are movable toward or away from each other by means of two pair of racks 39 and 41 disposed in spaced parallel relation across the underside of the knife carrier 16. The outer ends of the racks 39 and 41 are secured to their respective carriages 37 and 38 by cap screws 40, and the free ends of the racks 39 and 41 are engaged by rack gears 42 and 43, respectively. The rack gears 42 and 43 are keyed to carriage adjustment shafts 44 and 46, respectively, which are journaled in bearings 47 secured to the bottom side of the knife carrier 16 by cap screws 45. The shafts 44 and 46 project beyond the forward side of the knife carrier 16 and are provided with cross pins 48 for engagement by a sprocket wrench (not shown) during adjustment of the carriages 37 and 38 transversely along the base 11.

The carriages 37 and 38 are formed with dovetail grooves 37a and 38a, respectively, to slidably receive dovetail portions 51 and 52 formed on side knife holders 53 and 54, respectively, A pair of guide links 56 and 57 are pivotally connected at their one ends to the forward ends of the knife holders 53 and 54, respectively, and are journaled at their other ends on a guide shaft 58 which is secured at its ends in apertures formed in the front bearing frames 12—12.

The knife holders 53 and 54 are formed to receive adapters 59 and 61, respectively, the adapters being secured in position upon their respective knife holders by means of keys 60 and cap screws 62. Cutting knives 63 and 64, of the type adapted for use in trimming the head and foot of books, are adjustably secured to the adapters 59 and 61, respectively, by means of cap screws 65 and adjustment screws 66. During reciprocable movement of the knife carrier 16, it will be noted that the knives 63 and 64 are directed along an arcuate path due to their connection with the frame members 12—12 through the connecting links 56 and 57.

*Mounting of the transverse trimming knife*

Referring now more particularly to Figs. 7 and 16 in the drawings, a transverse knife holder 67 is formed with a dovetail portion 68 for reciprocable movement in a dovetail groove 69 formed in the underside of the guide plate 35. A guide link 71 is pivotally connected at its one end to one end of the knife holder 67, and is pivotally connected at its other end to a bracket 72 secured to a rear bearing frame 13. An adapter 73 is secured in position upon the knife holder 67 by means of cap screws 74 and a key 70. A transverse trimming knife 76 is adjustably mounted upon the adapter 73 by means of cap screws 77 and adjustment screws 75. During reciprocable movement of the knife carrier 16, it will be seen that a shearing stroke is imparted to the knife 76 due to the guiding action of the guide links 71.

Cutting tables

A pair of cutting blocks 78 and 79 are disposed below the knives 63 and 64, respectively, to coact therewith in trimming the head and foot of books, generally shown in dotted outline at B; and a cutting block 81 is positioned below the transverse knife 76 to coact therewith in trimming the front edges of books passing through the machine. The cutting blocks 78 and 79 are adjustably supported on side cutting tables 82 and 83, respectively; while the cutting block 81 is adjustable supported on a transverse cutting table 84. The cutting blocks 78, 79 and 81 are preferably formed square in cross section to provide four similar surfaces on each block suitable to coact with its respective knife in trimming the edges of a book. As illustrated in Figs. 17, 18 and 19, each cutting table 82, 83 and 84 is formed with an inclined surface 86 to coact with a tapered key 87 for raising or lowering its respective cutting block 78, 79 or 81. Each key 87 is adapted to be moved along its longitudinal axis by means of an adjustment screw 88 threaded into the end of its respective cutting table; after which, the cutting block is clamped in adjusted position by means of a clamping plate 89 and screws 91.

Hold-down device

Hold-down bars 92, 93 and 94 are mounted on hold-down frames 96, 97 and 98, respectively, to coact with their respective cutting tables 82, 83 and 84 in holding books against displacement during the trimming stroke of the knives 63, 64 and 76. Each bar is provided with a plurality of plunger rods 90 for reciprocable movement within cylindrical bores 95 formed in the hold-down frames. A compression spring 102 is disposed within each bore 95 to yieldably resist inward movement of its respective plunger rod 90; and bolts 101 are secured to the hold-down bars for engagement with the hold-down frames to limit the outward movement of the rods 90.

Book feed mechanism

A pair of lower feed racks 103 and 104, formed with teeth 105 along their undersides, are mounted for common reciprocable movement along the cutting tables 82 and 83, respectively, the upper surfaces of the feed racks being substantially flush with the upper surfaces of their respective cutting tables. The feed racks 103 and 104 are actuated by a pair of gears 106 and 107, respectively, mounted on a cross shaft 108 journaled on the front bearing frames 12—12. The shaft 108 is provided with a relatively long key for engagement in key slots formed in the axial openings of the gears 106 and 107 to permit axial adjustment of the gears along the shaft and to prevent rotational movement of the gears relative to the shaft or each other. It will also be noted that collars 106a and 107a are provided on the hubs of the gears 106 and 107 to hold the latter against axial displacement relative to their respective cutting tables 82 and 83.

A plurality of feed fingers 109 are journaled on shoulder screws 109a provided along a pair of upper feed racks 110 and 111 which are mounted for common reciprocable movement along rack supporting carriages 112 and 113, respectively. The rack supporting carriages are supported in spaced parallel relation upon a feed finger control shaft 114, a cross bar 116 and tie brackets 115 and 115a, the tie brackets being secured at their lower ends to the inner opposing sides of the cutting tables 82 and 83, respectively, by means of cap screws.

The upper end of each feed finger 109 is provided with a roller 117 journaled on a shoulder screw 117a. A pair of finger actuating bars 118 and 119 are mounted above the upper feed racks 110 and 111, respectively, for engagement with a book B. As illustrated in Figs. 7, 12, 13 and 14, the finger actuating bars 118 and 119 are suspended in spaced parallel relation for common swinging movement from their respective rack supporting carriages 112 and 113 by means of connecting links 121 and 122, respectively, and shoulder screws 120. Tension springs 123 are connected from the upper end of each finger 109 to its respective upper feed rack 110 or 111 to yieldably resist movement of the fingers out of their book engaging position, responsive to the action of their actuating bars 118 and 119.

Figure 3:
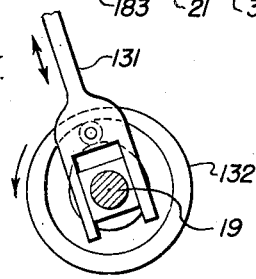
Fig. 3 is a fragmentary detail view.

The front ends of the finger actuating bars 118 and 119 are connected to crank arms 124 and 126, respectively, through connecting links 127. The crank arms are mounted for adjustable movement axially along the feed finger control shaft 114, but are secured against relative rotational movement by means of a key secured to the shaft for engagement in key slots formed in the crank arms. An arm 128 is secured to the feed finger control shaft 114 for engagement by a cam arm 131 operatively connected for reciprocable movement by a box cam 132 secured on the crank shaft 19, as illustrated in Figs. 1 and 3.

A pair of upper rack gears 133 and 134 are keyed to an upper rack drive shaft 136 to mesh with and impart reciprocable movement to the upper feed racks 110 and 111, respectively. The rack gears 133 and 134 are, however, free to be adjusted axially along the shaft 136 responsive to lateral movement of their respective rack supporting carriages 112 and 113.

Drive for book feed mechanism

Figure 2:
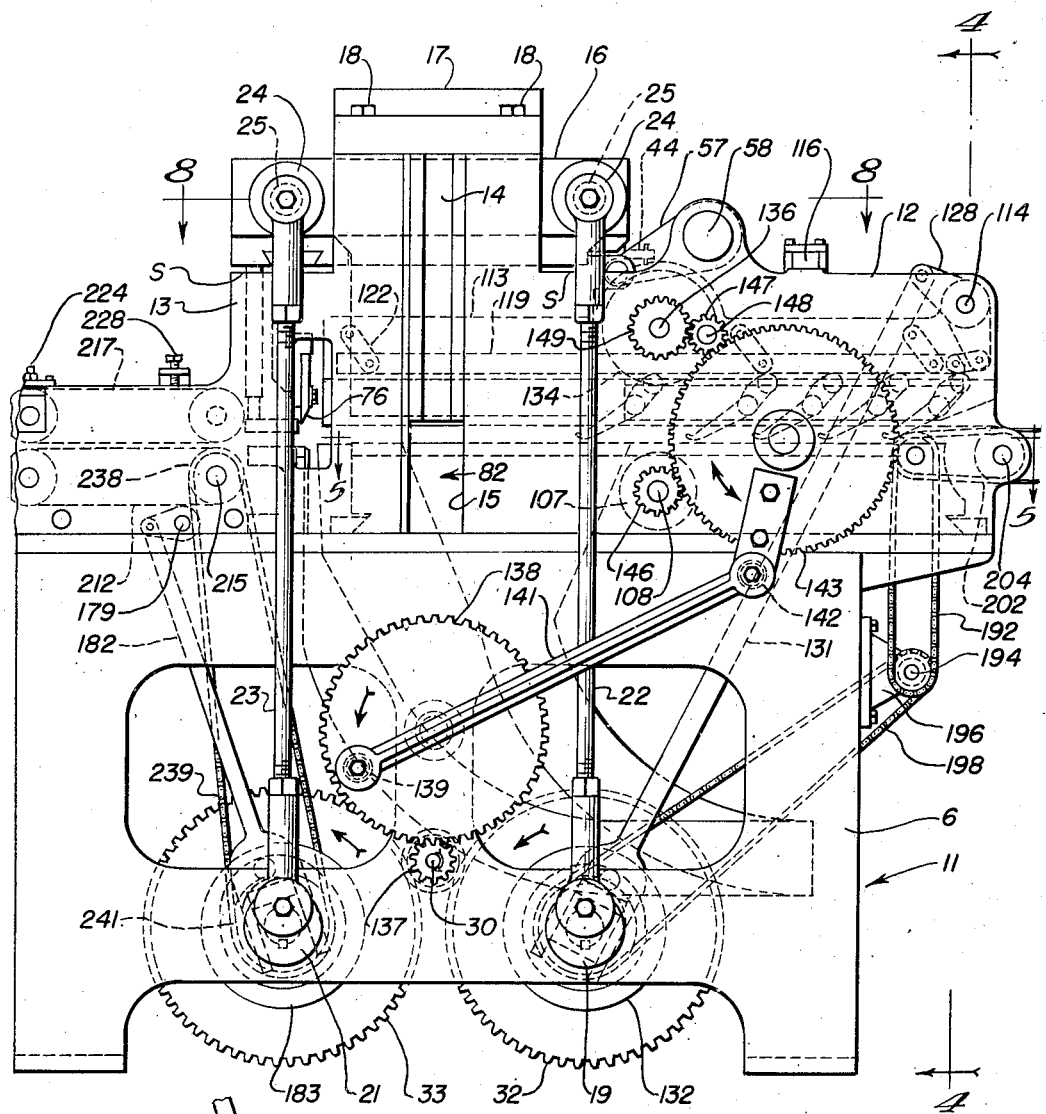
Fig. 2 is a side elevational view illustrating the opposite side of the machine.

Referring now to Fig. 2 in the drawings, a driving pinion 137 is keyed on the drive shaft 30 to drive a crank gear 138 journaled on the base 11, the crank gear being provided with a crank pin 139 to engage one end of a crank arm 141. The other end of the crank arm 141 is journaled on a stud 142 provided on a rack driving gear 143 which is journaled at 144 on a front bearing frame 12. The driving gear 143 meshes with a driven gear 146 keyed to the lower rack drive shaft 108. The driving gear 143 also meshes with an intermediate gear 147 journaled on a stud shaft 148. The intermediate gear 147 also meshes with a driven gear 149 keyed to the upper rack drive shaft 136.

Cutting table and book feed adjusting mechanism

Two similar adjustment mechanisms 151 and 151a are provided to adjust the spacing between the cutting tables 82 and 83 and the rack supporting carriages 112 and 113 secured thereto. As the adjustment mechanisms 151 and 151a are similar in construction and operation, only one set 151a is hereinafter particularly described although corresponding reference numbers have been applied to corresponding parts of set 151.

Figure 8:
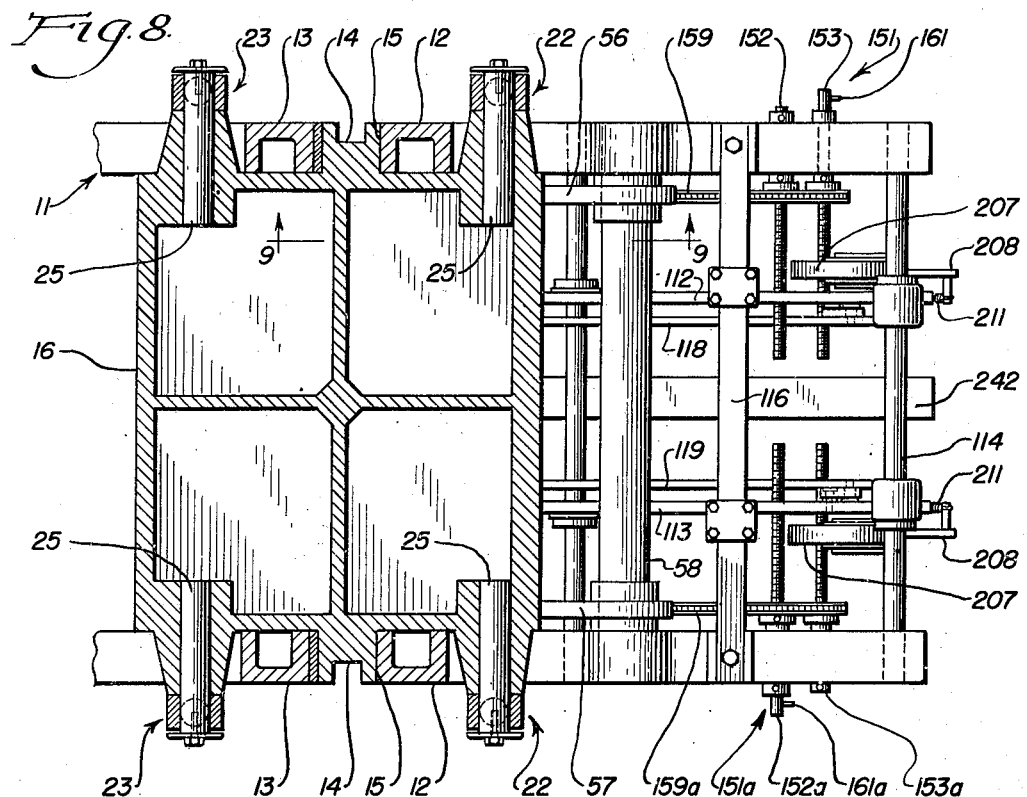
Fig. 8 is a sectional view taken along the line 8—8 of Fig. 2.
Figure 9:
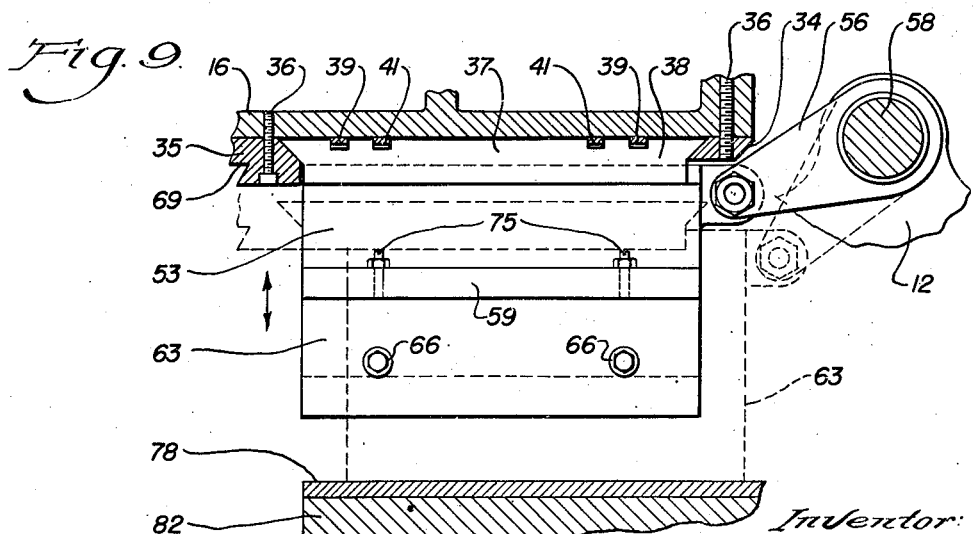
Fig. 9 is a sectional view taken along the line 9—9 of Fig. 8.

Referring now to Figs. 7 and 8, the adjustment mechanism 151a is shown as comprising three adjustment screws 152a, 153a and 154a journaled for rotational and non-axial movement in bearing frame members 12 and 13, the inner end of screw 151a being engaged in a threaded aperture provided in the rack supporting carriage 113, and the inner ends of screws 153a and 154a being engaged in threaded apertures provided in the cutting table 83. Sprockets 156a, 157a and 158a are keyed to the screws 152a, 153a and 154a, respectively, to receive an endless chain 159a. A pin 161a is provided on the outer end of the adjustment screws for engagement by a socket wrench (not shown) employed to rotate the screws and thus adjust the spacing between the cutting tables and rack supporting carriages supported thereon.

As illustrated in Fig. 7, a pair of guide plates 162 and 163, secured in spaced parallel relation upon the upper surface of the table top 9 of the base 11 by means of cap screws 164 are formed with opposing downwardly diverging side edges to engage the dovetail base portions 166—166 formed on the cutting tables 82 and 83.

Book stop mechanism

Referring now to Figs. 1, 5, 7 and 12 in the drawings, the book stop mechanism is shown as comprising a pair of stop bars 167 and 168 pivotally connected at their ends to the outer ends of arms 169—169a and 171—171a, respectively. The arms 169a and 171a are journaled at their inner ends on stud shafts 172 and 173, respectively, provided on the cutting tables 82 and 83, respectively; and the arms 169 and 171 are keyed at their inner ends on a stop control shaft 174 journaled in the bearing frames 12—12. The arms 169 and 171 are movable axially along the control shaft 174 responsive to lateral movement of their respective cutting tabels 82 and 83.

A crank arm 176 is keyed to the shaft 174 for engagement with one end of a connecting link 177 which has its other end connected to a crank arm 178 keyed to a countershaft 179. The shaft 179 is journaled in bearing frames 13—13 and has keyed thereto a crank arm 181 which is connected to one end of a cam actuated arm 182. The lower end of the arm 182 is operatively connected to and actuated by a box cam 183 secured on the crank shaft 21. The box cam 183 is similar in construction and operation to the cam 132 illustrated in Fig. 3 in the drawings, and the arm 182 is similar to the arm 131. Two sets of stop fingers 186 and 187 are provided on and extend upwardly from stop bars 167 and 168 to engage the forward edges of books B as the latter advance through the machine.

Book feed roll mechanism

Referring now to Figs. 1, 5, 7 and 8, the book feed roll mechanism is shown as comprising a pair of lower feed rolls 188—188 keyed against relative rotational movement on a roll shaft 189 but movable axially thereon responsive to lateral movement of their respective cutting tables 82 and 83. A sprocket 191 is secured to the roll shaft 189 for engagement by an endless chain 192 which also engages a sprocket 193 secured to a countershaft 194 journaled in bearings 196 mounted on the base 11. A sprocket 197 is also secured to the shaft 194 to be driven by an endless chain 198 leading from a sprocket 199 secured to the crank shaft 19. A sprocket 201 is also secured to the roll shaft 189 to act through an endless chain 202 to drive a sprocket 203 secured to a shaft 204 of an endless conveyor belt 206.

As illustrated in Figs. 7 and 8, a pair of auxiliary rolls 207—207 are journaled on the lower ends of rocker arms 208—208 to coact with the feed rolls 188—188 in moving books into the machine for engagement by the book feed mechanism. The rocker arms 208—208 are pivotally mounted intermediate their ends at 209 upon studs projecting laterally from the outer sides of the rack supporting carriages 112 and 113. Tension springs 211—211 are connected to the rack supporting carriages 112 and 113 and to the upper ends of the rocker arms 208—208 to yieldably resist movement of the auxiliary rolls 207—207 out of engagement with their respective feed rolls 188—188.

Book positioning and discharging mechanism

Referring now to Figs. 1, 7 and 15, the book positioning and discharging mechanism is shown as comprising a pair of lower feed belts 212—212 arranged in spaced parallel relation upon pulleys 213—213 and 214—214 which are secured to shafts 215 and 216 journaled in the bearing frames 13—13. A pair of upper feed belts 217—217 are positioned above the belts 212—212 to coact therewith in conveying books from the machine. The upper feed belts are mounted on pulleys 217—217 and 218—218 secured to shafts 219 and 220 which are journaled in a frame 221.

The ends of the shaft 219 are also journaled in slide blocks 222—222 mounted for vertical adjustment in recesses 223—223 formed in the bearing frames 13—13. Rear adjustment screws 224—224 are threaded through brackets 226—226 to engage and adjust the positions of the slide blocks 222—222; and compression springs 227—227 are interposed between the bearing frames 13—13 and the lower ends of the slide blocks to hold the latter against their respective adjustment screws. Front adjustment screws 228—228 are threaded through the frame 221 for engagement against the upper edges of the bearing frames 13—13.

A pair of similar stop bars 229—229 are disposed in spaced parallel relation between the lower feed belts 212—212 to carry adjustable stop fingers 231—231 which are adjustable longitudinally along their respective stop bars by means of slots 232—232 and locking bolts 233—233. The stop bars are supported on the outer ends of arms 234—234 and 236—236 secured to the shafts 179 and 237, respectively. As illustrated in Figs. 1, 7 and 15, the stop fingers 231—231 serve to hold a book in position to be trimmed along its front edge by the knife 78.

A sprocket 238 is secured to the shaft 215 for engagement by an endless chain 239 which is driven from a sprocket 241 secured to the crank shaft 21. During clockwise rotational movement of the crank shaft 21, as illustrated in Fig. 1, it will be noted that the adjacent opposing surfaces of the belts 212—212 and 217—217 coact to grip and move a book into position against the stop members 231—231.

Operation

In the operation of the machine thus described, untrimmed books are transferred from a feed hopper or binding machine (not shown) onto the conveyor belt 206 for delivery between the lower feed rolls 188—188 and auxiliary feed rolls 207—207. The feed rolls act to move the untrimmed book along the upper surfaces of the cutting tables 82 and 82 and center platform 242 for engagement between the lower feed racks 103 and 104 and the lower ends of the feed fingers 109. During forward movement of the lower feed racks 103 and 104 and upper feed racks 110 and 111, the lower ends of the fingers 109 are disposed in engagement against the upper side of a book by means of the tension springs 123. During rearward movement of the upper and lower feed racks, the fingers 109 are pivoted out of engagement with a book by means of the finger actuating bars 118 and 119.

During forward travel of untrimmed books, the back edge of each book is brought into engagement against the stop fingers 186 formed on the stop bars 167 and 168. The stop fingers 186 serve to align the back edge of a book and to hold books against forward movement through the machine during the trimming operation on the preceding books. The stop bars 167 and 168 are moved downwardly by means of the arms 169—169a and 171—171a to permit untrimmed books to pass over the stop fingers 186 and into aligning engagement against stop fingers 187 which are also provided on the stop bars 167 and 168.

After an untrimmed book has been brought into aligning engagement against the stop fingers 187, the knife carrier 16 is moved downwardly by means of crank shafts 19 and 21 acting through the connecting rods 22 and 23. During downward movement of the knife carrier, the hold-down members 92 and 93 are moved into contacting engagement with the book; after which, the knives 63 and 64 act to trim the head and foot of the book.

After trimming the head and foot of a book, the stop fingers 187 are caused to move downwardly to permit the book to move forward between the lower and upper feed belts 212 and 217 and into engagement against stop members 231. During downward movement of the knife carrier 16, the knife 76 acts to trim the front edge of the book. During the upward stroke of the knife carrier 16, the stop fingers 231 are retracted to permit the belts 212 and 217 to convey the trimmed book from the machine.

During each cutting stroke of the knife carrier 16, the knife carrier is brought into contacting engagement against the shoulders S formed on the upper edges of the bearing frames 12 and 13. This is an important feature of the present invention as the downward cutting stroke always terminates at a predetermined position to insure that the knives 63, 64 and 76 are brought into aligning engagement against the surfaces of their respective cutting blocks 78, 79 and 81. By limiting the downward cutting stroke of the cutting head, it has been found that a much longer service life is provided for the knives and cutting blocks.

It will further be noted that the machine is adapted for use in trimming books of different heights and widths by merely adjusting the positions of the carriages 37 and 38, the cutting tables 82 and 83 and the stop fingers 231. The spacing between the knife holders 53 and 54 is varied by rotating the shafts 44 and 46. The spacing between the cutting tables 82 and 83 is varied by rotational movement of the adjustment screws 153 and 154a. The stop fingers 231 are movable longitudinally along their stop bars 229 by merely loosening the bolts 233. During reciprocable movement of the knife carrier 16, the knives 63, 64 and 76 are moved along an arcuate path by means of the connecting links 56, 57 and 71.

While this invention has been shown in but one form, it is obvious to those skilled in the art that it is not so limited but is susceptible of various changes and modifications without departing from the spirit and scope of the claimed invention.

I claim as my invention:

1. In a book trimming machine, a base, a knife carrier mounted for vertical reciprocable movement above said base, abutment means provided on said base to be directly engaged by and to limit the downward movement of said knife carrier, and actuating means provided on said base to reciprocate said knife carrier.

2. In a book trimming machine, a base, a knife carrier mounted for vertical reciprocable movement above said base, fixed abutment means provided on said base to be directly engaged by and to limit the downward movement of said knife carrier, and actuating means provided on said base to reciprocate said knife carrier.

3. In a book trimming machine, a base, a knife carrier mounted for vertical reciprocable movement above said base, fixed abutment means provided on said base to be directly engaged by and to limit the downward movement of said knife carrier, and actuating means provided on said base to reciprocate said knife carrier, said abutment means being formed and disposed to be placed under compression when engaged by said knife carrier.

4. In a book trimming machine, a base, a knife carrier mounted for vertical reciprocable movement above said base, abutment means provided on said base to be directly engaged by and to limit the downward movement of said knife carrier, crank means journaled on said base, and connecting rods engaged to said knife carrier and said crank means.

5. In a book trimming machine, a base, a knife carrier mounted for vertical reciprocable movement above said base, abutment means provided on said base to be directly engaged by and to limit the downward movement of said knife carrier, crank means journaled on said base, and connecting rods engaged to said knife carrier and said crank means, and means to rotate said crank means.

6. In a book trimming machine, a base, a knife carrier mounted for vertical reciprocable movement above said base, abutment means provided on said base to be directly engaged by and to limit the downward movement of said knife carrier, a pair of crank shafts journaled on said base, each crank shaft having two crank portions, and a connecting rod engaging each crank portion and the adjacent corner of said knife carrier.

7. In a book trimming machine, a base, a knife carrier mounted for vertical reciprocable movement above said base, abutment means provided on said base to be directly engaged by and to limit the downward movement of said knife carrier, actuating means provided on said base to reciprocate said knife carrier, and a pair of cutting tables mounted in spaced parallel relation upon said base to receive and support books to be trimmed.

8. In a book trimming machine, a base, a knife carrier mounted for vertical reciprocable movement above said base, abutment means provided on said base to be directly engaged by and to limit the downward movement of said knife carrier, actuating means provided on said base to reciprocate said knife carrier, a pair of knife carriages mounted in spaced parallel relation on the underside of said knife carrier, and a pair of cutting tables mounted in spaced parallel relation upon said base to receive and support books to be trimmed.

9. In a book trimming machine, a base, a knife carrier mounted for vertical reciprocable movement above said base, abutment means provided on said base to be directly engaged by and to limit the downward movement of said knife carrier, actuating means provided on said base to reciprocate said knife carrier, a pair of knife carriages adjustably mounted in spaced parallel relation on the underside of said knife carrier, and a pair of cutting tables adjustably mounted in spaced parallel relation upon said base to receive and support books to be trimmed.

10. In a book trimming machine, a base, a knife carrier mounted for vertical reciprocable movement above said base, abutment means provided on said base to be directly engaged by and to limit the downward movement of said knife carrier, actuating means provided on said base to reciprocate said knife carrier, a pair of knife carriages adjustably mounted in spaced parallel relation on the underside of said knife carrier, a pair of cutting tables adjustably mounted in spaced parallel relation upon said base to receive and support books to be trimmed, and means to vary the spacing between said cutting tables.

11. In a book trimming machine, a base, a knife carrier mounted for vertical reciprocable movement above said base, abutment means provided on said base to be directly engaged by and to limit the downward movement of said knife carrier, actuating means provided on said base to reciprocate said knife carrier, a pair of knife carriages adjustably mounted in spaced parallel relation on the underside of said knife carrier, a pair of cutting tables adjustably mounted in spaced parallel relation upon said base to receive and support books to be trimmed, means to vary the spacing between said cutting tables, and separate means to vary the spacing between said knife carriages.

12. In a book trimming machine, a base, a knife carrier mounted for vertical reciprocable movement above said base, a pair of knives mounted in spaced parallel relation on the underside of said knife carrier to trim the head and foot of books, abutment means provided on said base to be directly engaged by and to limit the downward movement of said knife carrier, and actuating means provided on said base to reciprocate said knife carrier.

13. In a book trimming machine, a base, a knife carrier mounted for vertical reciprocable movement above said base, a pair of knives mounted in spaced parallel relation on the underside of said knife carrier to trim the head and foot of books, a third knife mounted on the underside of said knife carrier to trim the front edge of books, abutment means provided on said base to be directly engaged by and to limit the downward movement of said knife carrier, and actuating means provided on said base to reciprocate said knife carrier.

14. In a book trimming machine, a base, a knife carrier mounted for vertical reciprocable movement above said base, a pair of knives mounted in spaced parallel relation on the underside of said knife carrier to trim the head and foot of books, a third knife mounted on the underside of said knife carrier to trim the front edge of books, abutment means provided on said base to be directly engaged by and to limit the downward movement of said knife carrier, actuating means provided on said base to reciprocate said knife carrier, a book feed means to move books through said machine, and stop means to engage a book to be trimmed by said pair of knives.

15. In a book trimming machine, a base, a knife carrier mounted for vertical reciprocable movement above said base, a pair of knives mounted in spaced parallel relation on the underside of said knife carrier to trim the head and foot of books, a third knife mounted on the underside of said knife carrier to trim the front edge of books, abutment means provided on said base to be directly engaged by and to limit the downward movement of said knife carrier, actuating means provided on said base to reciprocate said knife carrier, a book feed means to move books through said machine, stop means to engage a book to be trimmed by said pair of knives, and another stop means to engage a book to be trimmed by said third knife.

16. In a book trimming machine, a base, a knife carrier mounted for vertical reciprocable movement above said base, a pair of knives mounted in spaced parallel relation on the underside of said knife carrier to trim the head and foot of books, abutment means provided on said base to be directly engaged by and to limit the downward movement of said knife carrier, actuating means provided on said base to reciprocate said knife carrier, and means to reciprocate said pair of knives endwise along said knife carrier responsive to reciprocable movement of the knife carrier.

17. In a book trimming machine, a base, a knife carrier mounted for vertical reciprocable movement above said base, a pair of knives mounted in spaced parallel relation on the underside of said knife carrier to trim the head and foot of books, a third knife mounted on the underside of said knife carrier to trim the front edge of books, abutment means provided on said base to be engaged by and to limit the downward movement of said knife carrier, actuating means provided on said base to reciprocate said knife carrier, means to reciprocate said pair of knives endwise along said knife carrier responsive to reciprocable movement of the knife carrier, and means to reciprocate said third knife endwise along said knife carrier responsive to reciprocable movement of the knife carrier.

18. In a book trimming machine, a base, a knife carrier mounted for vertical reciprocable movement above said base, a pair of knives mounted in spaced parallel relation on the underside of said knife carrier to trim the head and foot of books, a third knife mounted on the underside of said knife carrier to trim the front edge of books, abutment means provided on said base to be engaged by and to limit the downward movement of said knife carrier, actuating means provided on said base to reciprocate said knife carrier, means to reciprocate said pair of knives endwise along said knife carrier responsive to reciprocable movement of the knife carrier, means to reciprocate said third knife endwise along said knife carrier responsive to reciprocable movement of the knife carrier, a pair of cutting tables mounted in spaced parallel relation upon said base to coact with said pair of knives, and a cutting table mounted on said base to coact with said third knife.

19. In a book trimming machine, a base, a knife carrier mounted for vertical reciprocable movement above said base, a pair of knives mounted in spaced parallel relation on the underside of said knife carrier to trim the head and foot of books, a third knife mounted on the underside of said knife carrier to trim the front edge of books, abutment means provided on said base to be engaged by and to limit the downward movement of said knife carrier, actuating means provided on said base to reciprocate said knife carrier, means to reciprocate said pair of knives endwise along said knife carrier responsive to reciprocable movement of the knife carrier, means to reciprocate said third knife endwise along said knife carrier responsive to reciprocable movement of the knife carrier, a pair of cutting tables mounted in spaced parallel relation upon said base to coact with said pair of knives, a cutting table mounted on said base to coact with said third knife, means to adjust the spacing between said pair of knives, and means to adjust the spacing between said pair of cutting tables.

20. In a book trimming machine, a base, feed means to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, and means provided on said transversely disposed knife holder to receive and engage a knife to trim the front edge of a book.

21. In a book trimming machine, a base, feed means to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, and means to move said pair of knife-supporting holders transversely relative to said knife carrier.

22. In a book trimming machine, a base, feed means to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, and stop means to hold a book in position to be trimmed at its head and foot.

23. In a book trimming machine, a base, feed means to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, stop means to hold a book in position to be trimmed at its head and foot, and other stop means to hold a book in position to be trimmed along its front edge.

24. In a book trimming machine, a base, feed means to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, stop means to hold a book in position to be trimmed at its head and foot, other stop means to hold a book in position to be trimmed along its front edge, and means to move said pair of knife-supporting holders transversely relative to said knife carrier.

25. In a book trimming machine, a base, feed means to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, stop means to hold a book in position to be trimmed at its head and foot, other stop means to hold a book in position to be trimmed along its front edge, and rack and pinion means to independently move said pair of knife-supporting holders transversely relative to said knife carrier.

26. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, and means provided on said transversely disposed knife holder to receive and engage a knife to trim the front edge of a book.

27. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, means to move said pair of knife-supporting holders transversely relative to said knife carrier, and means to move each of the two sets of coacting feed mechanisms transversely relative to said base.

28. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, rack and pinion means to move said pair of knife-supporting holders transversely relative to said knife carrier, and means to move each of the two sets of coacting feed mechanisms transversely relative to said base.

29. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, means provided on said transversely disposed knife holder to receive and engage a knife to trim the front edge of a book, rack and pinion means to move said pair of knife-supporting holders transversely relative to said knife carrier, and adjustment screw means to move each of the two sets of coacting feed mechanisms transversely relative to said base.

30. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier.

31. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, and stop means to hold a book in position to be trimmed at its head and foot.

32. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, stop means to hold a book in position to be trimmed at its head and foot, and means to move said pair of knife supporting holders transversely relative to said knife carrier.

33. In a book trimming machine, a base, two similar sets of coacting feed mechanisms disposed in spaced parallel relation to move books longitudinally along said base, a knife carrier mounted on said base for vertical reciprocable movement, a pair of knife-supporting holders adjustably mounted for movement transversely along the underside of said knife carrier, means provided on said pair of knife-supporting holders to receive and engage knives disposed in spaced parallel relation to trim the head and foot of a book, a transversely disposed knife holder mounted on the underside of said knife carrier, stop means to hold a book in position to be trimmed at its head and foot, means to move said pair of knife-supporting holders transversely relative to said knife carrier, and means to move each of the two sets of coacting feed mechanisms transversely relative to said base.

CHARLES L. MOYER.

REFERENCES CITED

The following references are of record in the file of this patent:

UNITED STATES PATENTS

| Number | Name | Date |
|---|---|---|
| 490,877 | Lovell | Jan. 31, 1893 |
| 1,003,679 | Welch | Sept. 19, 1911 |
| 1,076,726 | Welch | Oct. 28, 1913 |
| 1,629,233 | Streine | May 17, 1927 |
| 1,798,017 | Free | Mar. 24, 1931 |
| 2,017,462 | Kleineberg | Oct. 15, 1935 |